United States Patent
Scharfenberg

(10) Patent No.: US 6,769,253 B1
(45) Date of Patent: Aug. 3, 2004

(54) TURBINE POWER PLANT UTILIZING BUOYANT FORCE

(75) Inventor: Daniel S. Scharfenberg, 818 W. Moss Ave., Peoria, IL (US) 61606

(73) Assignee: Daniel S. Scharfenberg, Peoria, IL (US)

( * ) Notice: Subject to any disclaimer, the term of this patent is extended or adjusted under 35 U.S.C. 154(b) by 0 days.

(21) Appl. No.: 10/280,417

(22) Filed: Oct. 25, 2002

Related U.S. Application Data

(60) Provisional application No. 60/336,375, filed on Oct. 25, 2001.

(51) Int. Cl.[7] ............................................... F03C 1/00
(52) U.S. Cl. ......................................... 60/496; 60/495
(58) Field of Search ................................... 60/495, 496

(56) References Cited

U.S. PATENT DOCUMENTS

| | | | |
|---|---|---|---|
| 29,149 A | | 7/1860 | Durham |
| 98,846 A | * | 1/1870 | Call ............................... 60/496 |
| 257,505 A | * | 5/1882 | McMillan ....................... 62/77 |
| 2,135,110 A | * | 11/1938 | Platt ............................. 60/496 |
| 2,513,136 A | * | 6/1950 | Boros ........................... 60/496 |
| 3,715,885 A | | 2/1973 | Schur |
| 4,038,826 A | * | 8/1977 | Shaw ....................... 60/641.14 |
| 4,141,218 A | | 2/1979 | Rayboy |
| 4,196,590 A | | 4/1980 | Fries |
| 4,266,402 A | | 5/1981 | Pruett |
| 4,363,212 A | * | 12/1982 | Everett ......................... 60/496 |
| 4,498,294 A | * | 2/1985 | Everett ......................... 60/496 |
| 4,683,720 A | | 8/1987 | De Shon |
| 4,753,070 A | | 6/1988 | Werner |
| 4,981,015 A | | 1/1991 | Simpson |
| 5,051,059 A | | 9/1991 | Rademacher |
| 5,555,728 A | | 9/1996 | Welch, Jr. |
| 5,685,147 A | | 11/1997 | Brassea |
| 5,800,123 A | | 9/1998 | Travor |
| 6,195,991 B1 | | 3/2001 | De Shon |

* cited by examiner

Primary Examiner—Hoang Nguyen
(74) Attorney, Agent, or Firm—Husch & Eppenberger, LLC; Robert C. Haldiman; David A. Chambers

(57) ABSTRACT

A turbine power plant utilizing buoyant force is disclosed. This turbine power plant includes a turbine wheel having a vane, wherein the turbine wheel is rotatably attached to a shaft, wherein the vane includes a housing having a chamber for receiving air to propel the at least one turbine wheel, wherein the shaft is operatively attached to an electrical generator for producing electricity through rotation of the shaft. Although the preferred design for the turbine wheel is a quad vane, e.g., fin, design, a wide variety of other vane designs may suffice including dual fin and wing designs. Preferably, there is a weighted portion located within the housing of a fin for the turbine wheel for pulling the turbine wheel downward to facilitate rotation. Moreover, a duct is preferably located within the chamber of the fin to assist the air to rise to the top of the chamber and increase the effectiveness of the buoyant force supplied by the air.

11 Claims, 12 Drawing Sheets

US 6,769,253 B1

TURBINE POWER PLANT UTILIZING BUOYANT FORCE

CROSS-REFERENCE

This application claims priority of prior Provisional Application No. 60/336,375, filed Oct. 25, 2001.

BACKGROUND OF THE INVENTION

This invention relates generally to a turbine power plant powered by buoyant force and an associated method of operation. The introduction of a gas, e.g., air, underwater can be a powerful force that can produce a significant amount of lift that can propel vanes in a turbine to produce electricity.

A typical power plant runs on either fossil fuel or nuclear energy. Fossil fuel requires either dependence on foreign oil producing nations or creates significant environmental damage due to the mining and drilling associated with the fossil fuel. This is in addition to the problems associated with the burning of the fossil fuel. Nuclear energy is extremely problematic with a significant health risk posed by radiation as well as major issues regarding the disposal of spent nuclear fuel.

Therefore, the current commercial methods of producing electricity can be detrimental to a person's health as well as the environment. This can also include a significant amount of noise pollution.

There is currently a significant energy shortage with major portions of the world desperately needing more power from an environmentally safe source.

There are complicated turbines that inject the water on the top of the structure and then use a bypass conduit to dispel the water to create a buoyant turbine such as that disclosed in U.S. Pat. No. 4,266,402, which issued to Pruett on May 12, 1981. This device also includes a water tank formed of walls that loads the water from the top of the rotating turbine. This structure requires tanks and fluid conduits, which can result in leakage.

The present invention is directed to overcoming one or more of the problems set forth above.

SUMMARY OF THE INVENTION

In one aspect of this invention, a turbine power plant utilizing buoyant force is disclosed. This turbine power plant includes at least one turbine wheel having a vane, wherein the turbine wheel, having a first side and a second side, is attached to a shaft that is rotatably attached to a first bushing located on a first support member that is located opposite the first side of the turbine wheel and the shaft is rotatably attached to a second bushing located on a second support member that is located opposite the second side of the turbine wheel, wherein the at least one vane includes a housing in the shape of a curved quarter circle for reducing drag, the housing having a chamber for receiving air to propel the at least one turbine wheel, wherein the shaft is operatively attached to an electrical generator for producing electricity through rotation of the shaft.

In another aspect of this invention, a slideable wing is utilized such that the vane moves within the turbine wheel thereby reducing the drag on the vane and turbine wheel.

It is another aspect of this present invention to utilize a duct located within a chamber of a vane for a turbine wheel to direct the air to the top of the vane to maximize the application of the buoyant force to the turbine wheel.

Yet another aspect of this present invention is to provide a weighted portion in a vane for a turbine wheel to provide a downward cycle of movement to the turbine wheel and facilitate rotation of the turbine wheel.

Still another aspect of this present invention is to provide a simple fluid tank for housing the at least one turbine wheel without having a complicated structure and fluid conduits that are prone to leakage and corrosion.

Another aspect of the present invention is that small amounts of air can provide a tremendous amount of buoyant force to the turbine wheel.

Yet another aspect of the present invention is that there is no pollution, i.e., zero emissions, so that it is completely safe for the environment.

In another aspect of the present invention a turbine power plant is very easy to manufacture so that large quantities can be produced.

Yet another aspect of the present invention is that there is no fossil or nuclear fuel utilized, which eliminates some of the tremendous problems associated with each form of energy such as mining, drilling, pollution and disposing of waste.

These are merely some of the innumerable illustrative aspects of this present invention and should not be deemed an all-inclusive listing.

Before explaining the invention in detail, it is to be understood that the design and application of the invention is not to be limited to the following description or illustrations. This invention is capable of being carried out in a number of other ways as will be apparent to one skilled in the art.

DETAILED DESCRIPTION OF THE INVENTION

Figure 1:
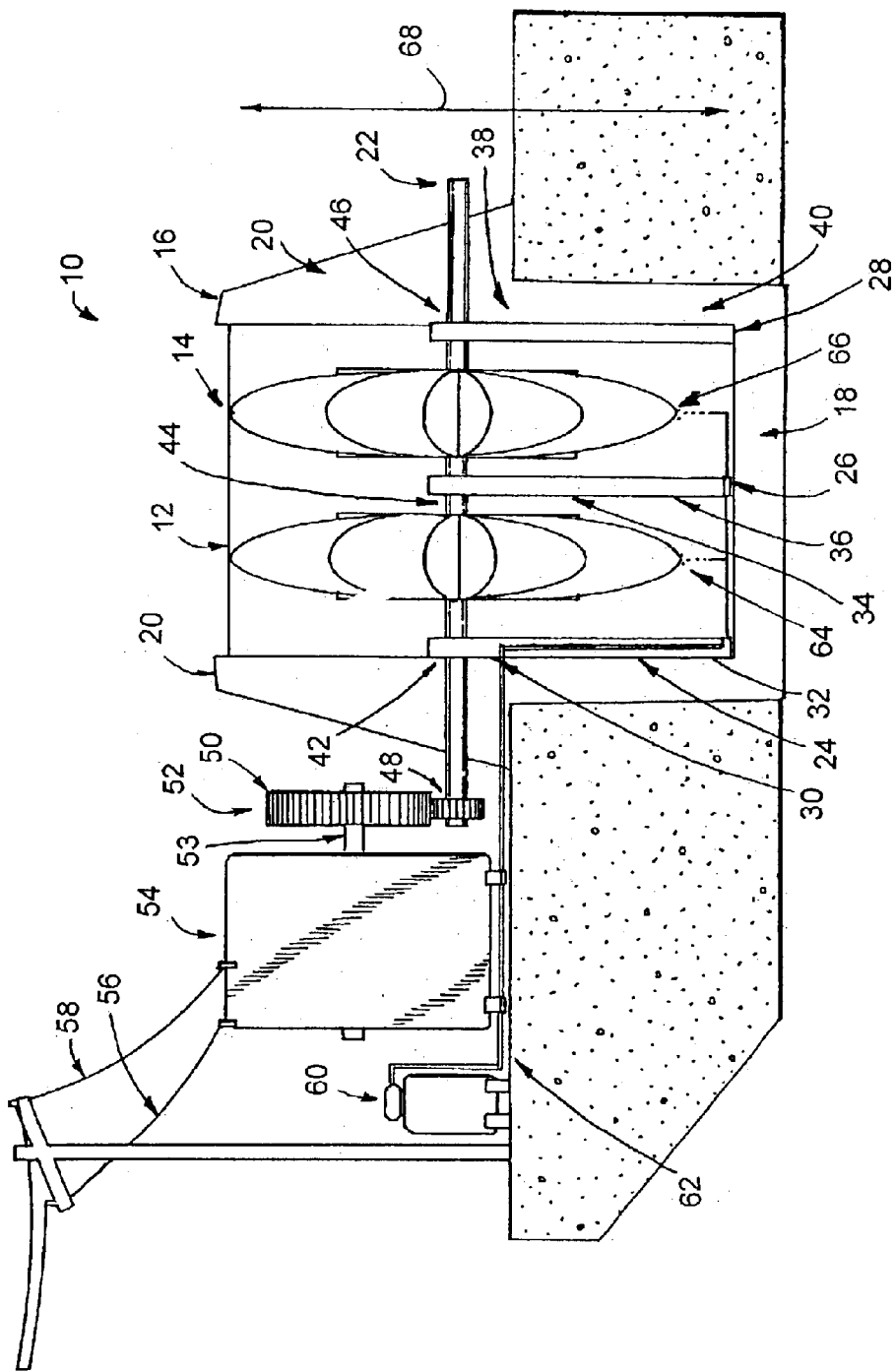
FIG. 1 is a front view of a turbine power plant system utilizing buoyant force in accordance with the present invention.

Referring now to the drawings, and initially to FIG. 1, a power plant system for generating electricity based on buoyant force is generally indicated by numeral 10. In the preferred embodiment, there are dual overlapping turbines generally indicated by numerals 12 and 14, respectively. The dual overlapping turbines, i.e., which include a first turbine wheel 12 and a second turbine wheel 14 are located in a tank 16 of liquid. The liquid is preferably water, however, a wide variety of liquids will suffice. The tank 16 of liquid includes a bottom 18 as well as side walls 20. There is a shaft 22 that extends through a center point for the first turbine wheel 12 and is fixedly attached thereto. The shaft 22 also extends through a center point for the second turbine wheel 14 and is fixedly attached thereto. The shaft 22 is suspended within the tank 16 by a first support member 24, a second support member 26 and a third support member 28. The first support member 24 includes a top portion 30 and a bottom portion 32 where a first bushing 42 is either attached to the top portion 30 of the first support member 24 or is integral thereto. The second support member 26 includes a top portion 34 and a bottom portion 36 where a second bushing 44 is either attached to the top portion 34 of the second support member 26 or is integral thereto. The third support member 28 includes a top portion 38 and a bottom portion 40 where a third bushing 46 is either attached to the top portion 38 of the third support member 28 or is integral thereto. The first turbine wheel 12 is located between the first support member 24 and the second support member 26 and rotates within the tank 16 of liquid due to the first bushing 42 and the second bushing 44. The second turbine wheel 14 is located between the second support member 26 and the third support member 28 and rotates within the tank 16 of liquid due to the second bushing 44 and the third bushing 46.

On one end of the shaft 22 is a first gear 48 that engages a second gear 50. This first gear 48 and second gear 50 together form a gearing mechanism 52, which can be used to increase the revolutions per minute of rotation from that obtained by the rotation of the shaft 22. Preferably, the first gear 48 is much smaller than the second gear 50. This second gear 50 is attached to an axle 53 that is connected to an electrical generator 54. The electrical generator 54 produces electrical energy, which is delivered through electrical conduits, e.g., wires 56 and 58, respectively.

There is an air compressor 60 that supplies gas, e.g., air, through a gas hose 62 to both a first gas nozzle 64 and a second gas nozzle 66. The gas released from the first gas nozzle 64 rotates the first turbine wheel 12 and the gas released from the second gas nozzle 66 rotates the second turbine wheel 14. The preferred height of the tank 16 is about thirty (30) feet (9.144 meters).

Figure 2:
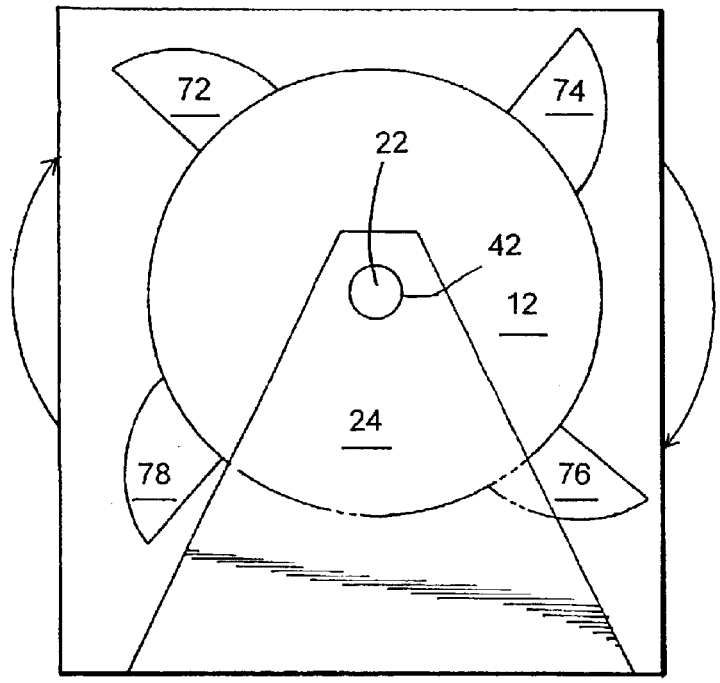
FIG. 2 is a side view of the preferred embodiment of a quad vane, e.g. fin, turbine wheel, as shown in FIG. 1, in accordance with the present invention.

Referring now to FIG. 2, a side view of the first turbine wheel 12 of the preferred embodiment of the quad vane, e.g., fin, design is shown. The first turbine wheel 12 is rotatably connected to the shaft 22 that rotates within the first bushing 42 of the first support member 24. There is a first vane, e.g., fin, 72, a second vane, e.g., fin, 74, a third vane, e.g., fin, 76 and a fourth vane, e.g., fin, 78 associated with the first turbine wheel 12.

Figure 3:
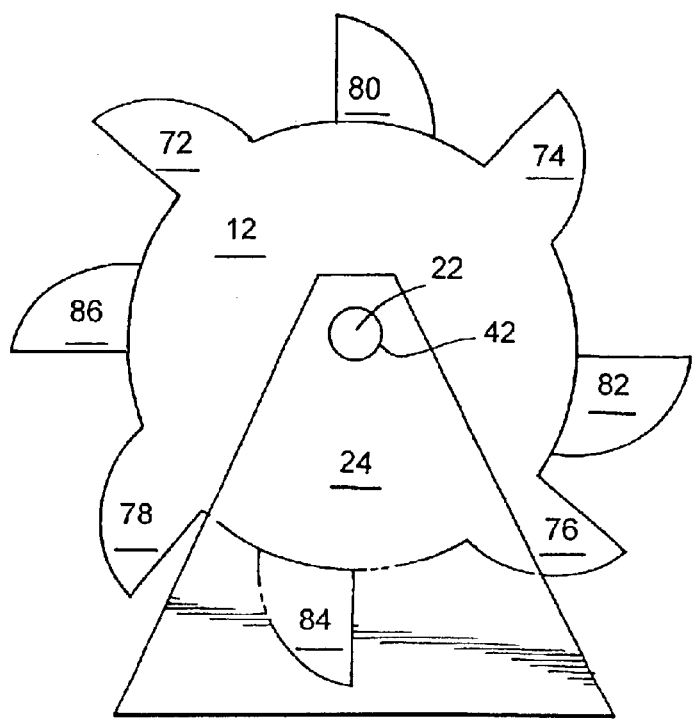
FIG. 3 is a side view of the preferred embodiment of a dual overlapping quad vane, e.g. fin, turbine wheels, as shown in FIG. 1, in accordance with the present invention.

Referring now to FIG. 3, a side view of the dual overlapping first and second turbine wheels 12 and 14 is shown. The first turbine wheel 12 is rotatably connected to the shaft 22 that rotates within the first bushing 42 of the first support member 24. The fifth vane, e.g., fin, 80, sixth vane, e.g., fin, 82, seventh vane, e.g., fin, 84 and eighth vane, e.g., fin, 86 associated with the second turbine wheel 14 is also shown.

Figure 4:
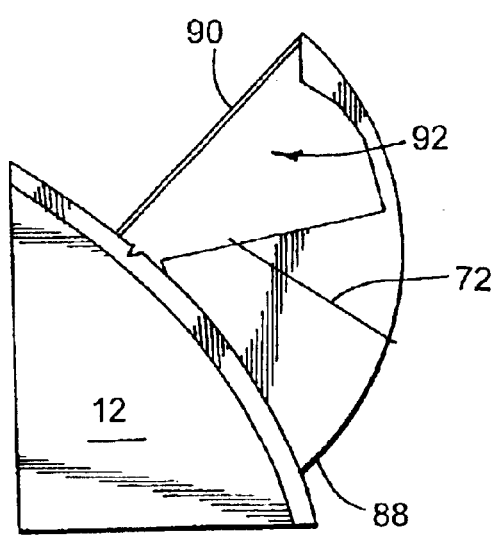
FIG. 4 is an isolated side view of a single vane, e.g. fin, for the quad vane, e.g. fin, turbine wheel of the preferred embodiment, as shown in FIG. 1, in accordance with the present invention.

Referring now to FIG. 4, an isolated side view of the first vane, e.g., fin, 72 5 is shown. This includes a housing 88, having an opening 90 in a chamber 92 that forms an air pocket in the first vane, e.g., fin, 72. The preferred size of the chamber 92 is about four (4) cubic feet (0.1133 cubic meters). The preferred volume of the chamber 92 is about 4.5 gallons (17.034 liters). The preferred weight of the housing 88 is about fifty (50) pounds (22.68 kilograms).

Figure 5:
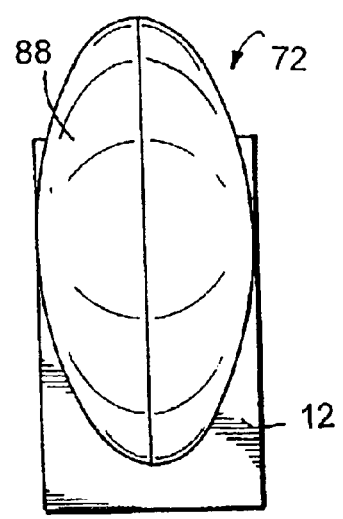
FIG. 5 is an isolated front view of a single vane, e.g. fin, for the quad vane, e.g. fin, turbine wheel of the preferred embodiment, as shown in FIG. 1, in accordance with the present invention.

Referring now to FIG. 5, which is a front view of a preferred quad vane, e.g., fin, first turbine wheel 12. The housing 88 of the first vane, e.g., fin, 72 is again shown. Although the back of the housing 88 can be in a wide variety of geometric shapes, the preferred shape is a curved quarter of a circle in a form that is similar to a shark's fin, which is sleek, smooth and hydrodynamic in order to cut through the water smoothly. In other words, the housing 88 is quadrantal and elliptical. The preferred shape of a curved quarter circle reduces the drag on each vane, for example the first vane, e.g. fin 72.

Figure 6:
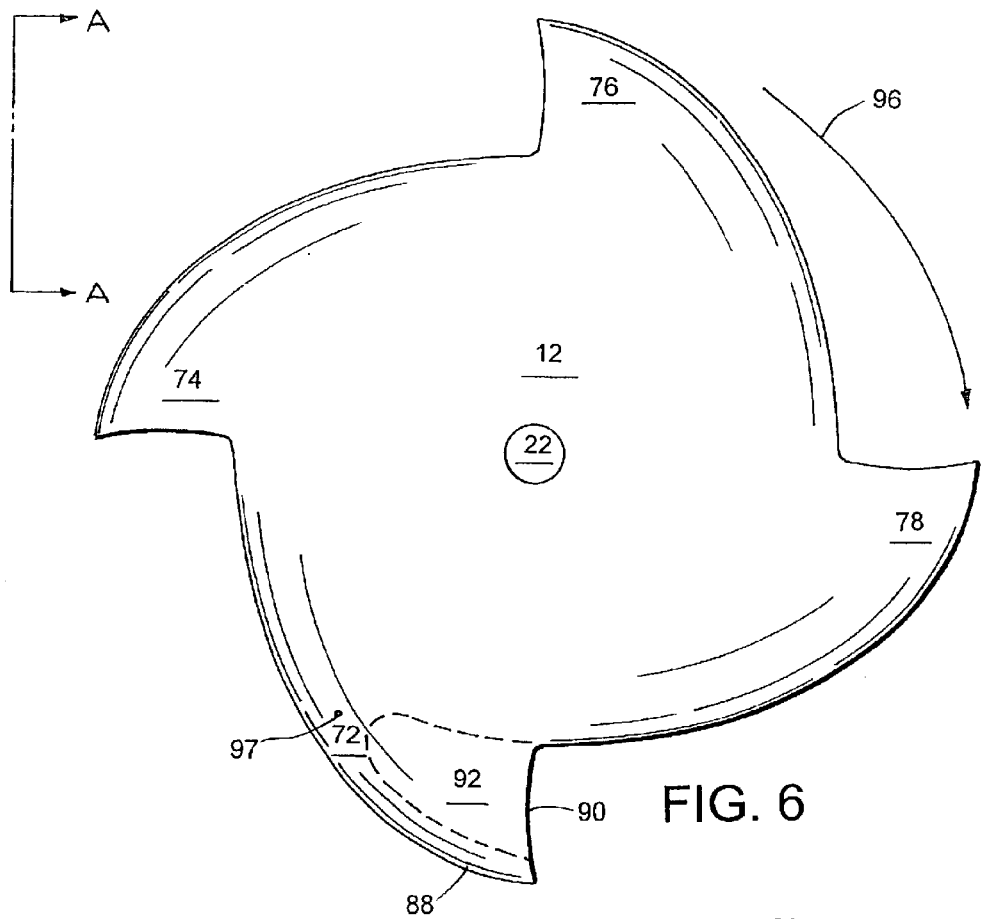
FIG. 6 is a side view of the preferred embodiment of a quad vane, e.g. fin, turbine wheel with an illustrated air pocket, as shown in FIG. 1, in accordance with the present invention.
Figure 8:
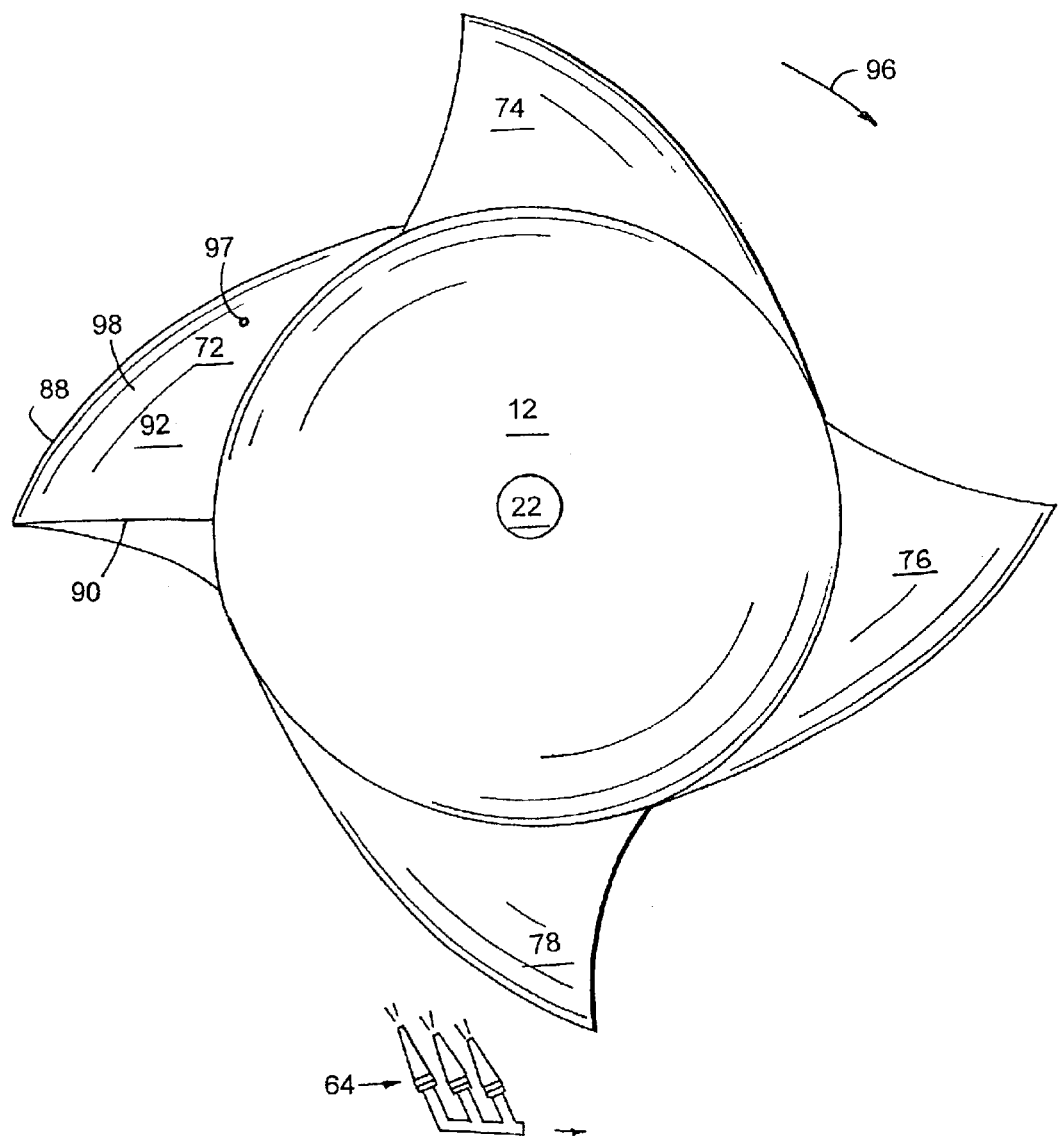
FIG. 8 is a side view of the preferred embodiment of a quad vane, e.g. fin, turbine wheel, with an illustrated air pocket and air jet nozzles, in accordance with the present invention.

Referring now to FIGS. 6 and 8, a side view of the first turbine wheel 12 in the preferred quad vane, e.g., fin, embodiment is shown. This includes the first vane, e.g., fin, 72 with the opening 90 in the chamber 92 that forms an air pocket within the housing 88. There is also a weighted area 97 that is preferably located in a front portion of the housing 88 of the first fin 72. This feature is replicated for the second, third and fourth vanes, e.g., fins, 74, 76 and 78, respectively. This weighted area 97 pulls the first turbine wheel 12 into a downward cycle as indicated by numeral 96.

Figure 7:
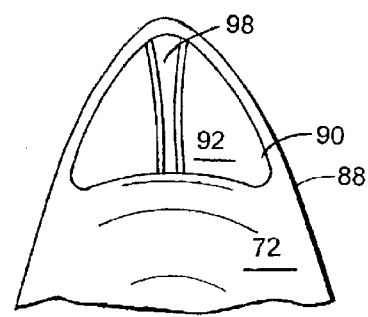
FIG. 7 is an isolated back view of a single vane, e.g. fin, for a quad vane, e.g. fin, turbine wheel of the preferred embodiment, as shown in FIG. 1, in accordance with the present invention.

Referring now to FIG. 7, there is an isolated back view of the first vane, e.g., fin, 72 that includes the chamber 92 that forms an air pocket within the housing 88. In the back inside wall of the chamber 92 is a duct 98. This duct 98 can be of any geometric shape, however, it is preferably rectangular. The duct 98 operates as a manifold to receive the compressed gas, e.g., air, as it is released from the at least one first gas nozzle 64, which is preferably a series of three (3) gas nozzles, as shown in FIG. 8. The at least one first gas nozzle 64 operates as a jet to shoot compressed air into the duct 98 that delivers the gas to the top of the chamber 92 and forces out the liquid, e.g., water. This duct 98 allows the gas, e.g., air, to travel the top of the chamber 92 so that no liquid, e.g., water, is trapped inside.

Figure 9:
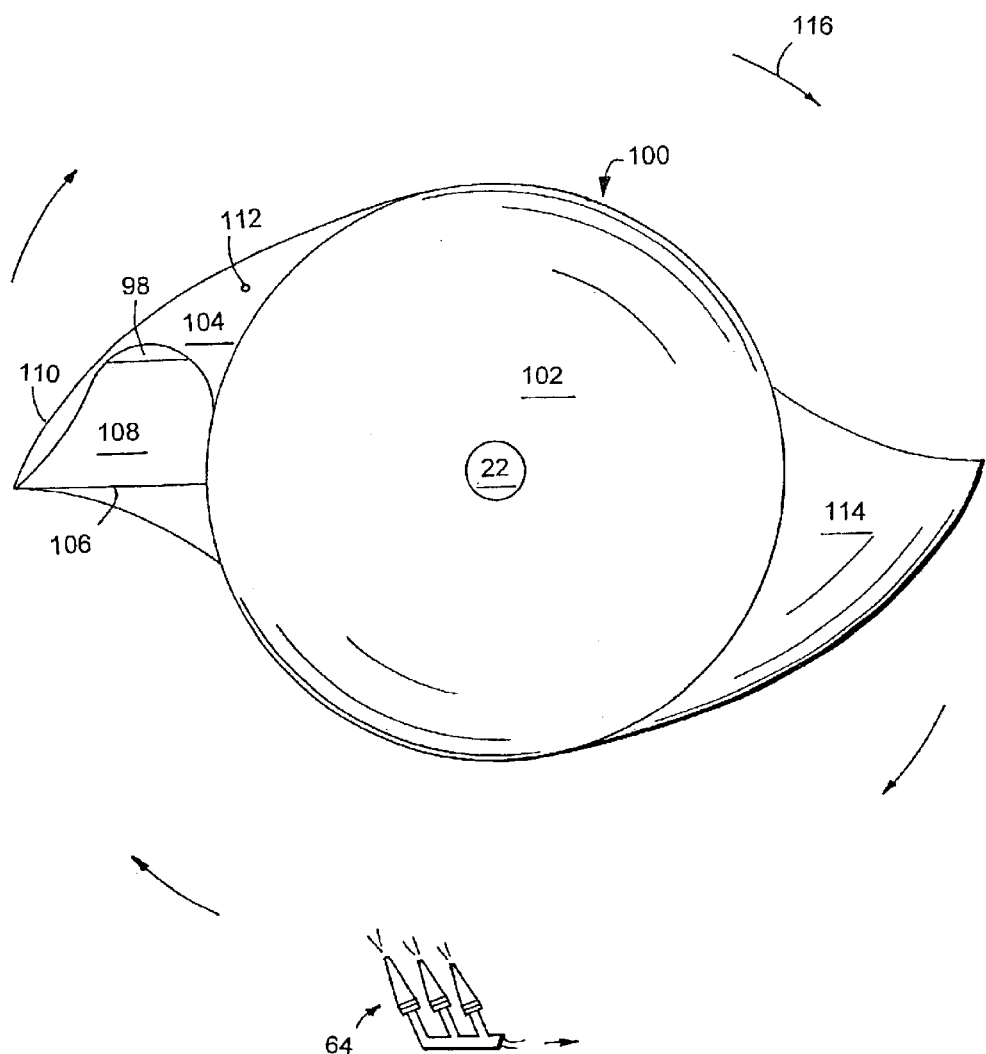
FIG. 9 is a side view of a first alternative embodiment of a dual vane, e.g. fin, turbine wheel, with an illustrated air pocket and air jet nozzles, in accordance with the present invention.

Referring now to FIG. 9, a side view of a first alternative embodiment of a dual vane, e.g., fin, embodiment is shown and generally indicated by numeral 100. The first turbine wheel is generally indicated by numeral 102. This dual vane, e.g., fin, embodiment 100 includes a first vane, e.g., fin, 104, the opening 106 in the chamber 108 that forms an air pocket within the housing 110. There is also a weighted area 112 that is preferably located in a front portion of the housing 110 of the first vane, e.g., fin, 104. This feature is replicated for the second vane, e.g., fin, 114, respectively. This weighted area 112 pulls the first turbine wheel 102 into a downward cycle as indicated by numeral 116.

Figure 10:
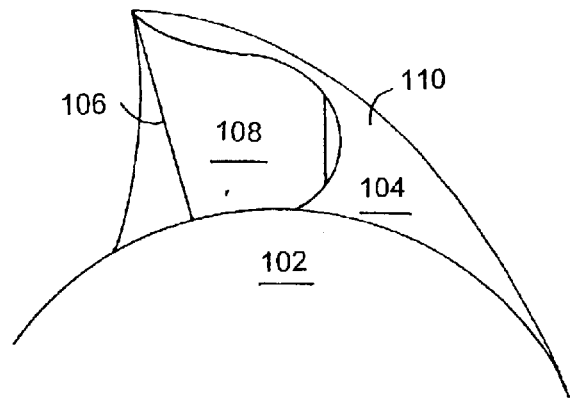
FIG. 10 is an isolated cut-away side view of a single vane, e.g. fin, for the dual vane, e.g. fin, turbine wheel of the first alternative embodiment, as shown in FIG. 9, in accordance with the present invention.

Referring now to FIG. 10, an isolated side view of the first vane, e.g., fin, 104 is shown. This includes the housing 110, having the opening 106 in a chamber 108 that forms an air pocket in the first vane, e.g., fin, 104. The preferred size of the chamber 108 is about four (4) cubic feet (0.1133 cubic meters). The preferred volume of the chamber 108 is about 4.5 gallons (17.034 liters). The preferred weight of the housing 108 is about fifty (50) pounds (22.68 kilograms).

Figure 11:
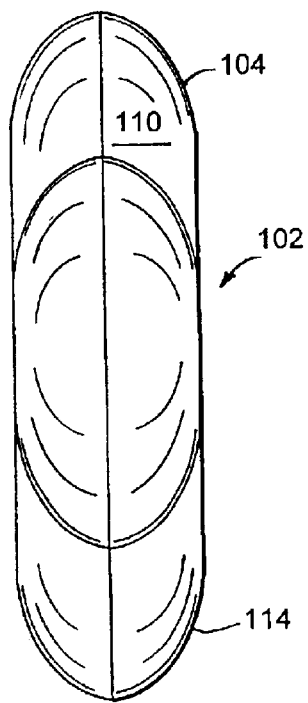
FIG. 11 is a front view for the dual vane, e.g. fin, turbine wheel of the first alternative embodiment, as shown in FIG. 9, in accordance with the present invention.

Referring now to FIG. 11, which is a front view of the first turbine wheel 102 for the dual vane, e.g., fin embodiment 100. The first vane, e.g., fin, 104 is again shown with the associated housing 110. Although the back of the housing 110 can be in a wide variety of geometric shapes, the preferred shape is a curved quarter of a circle in a form that is similar to a shark's fin, which is sleek, smooth and hydrodynamic so that it can cut through the water smoothly. In other words, the housing 110 is quadrantal and elliptical. The second vane, e.g., fin, 114 is also shown. The preferred shape of a curved quarter circle reduces the drag on each vane, for example the first vane, e.g. fin 104.

Figure 12:
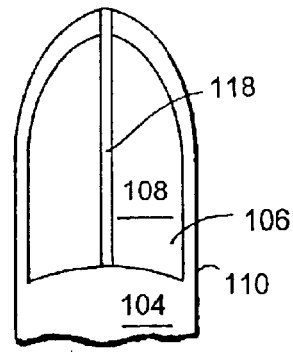
FIG. 12 is an isolated front view of a single vane, e.g. fin, for the dual vane, e.g. fin, turbine wheel of the first alternative embodiment, as shown in FIG. 9, in accordance with the present invention.

Referring now to FIG. 12, there is an isolated back view of the first vane, e.g., fin, 102 that includes the chamber 108 that forms an air pocket within the housing 110. In the back inside wall of the chamber 108 is a duct 118. This duct 118 can be of any geometric shape, however, it is preferably rectangular. The duct 118 operates as a manifold to receive the compressed gas, e.g., air as it is released from the at least one first gas nozzle 64, which is preferably a series of three (3) gas nozzles, as shown in FIG. 9. The at least one first gas nozzle 64 operates as a jet to shoot compressed air into the duct 118 that delivers the gas to the top of the chamber 108 and forces out the liquid, e.g., water. This duct 118 is able to get the gas, e.g., air, to the top of the chamber 108 so that no liquid, e.g., water, is trapped inside.

Figure 13:
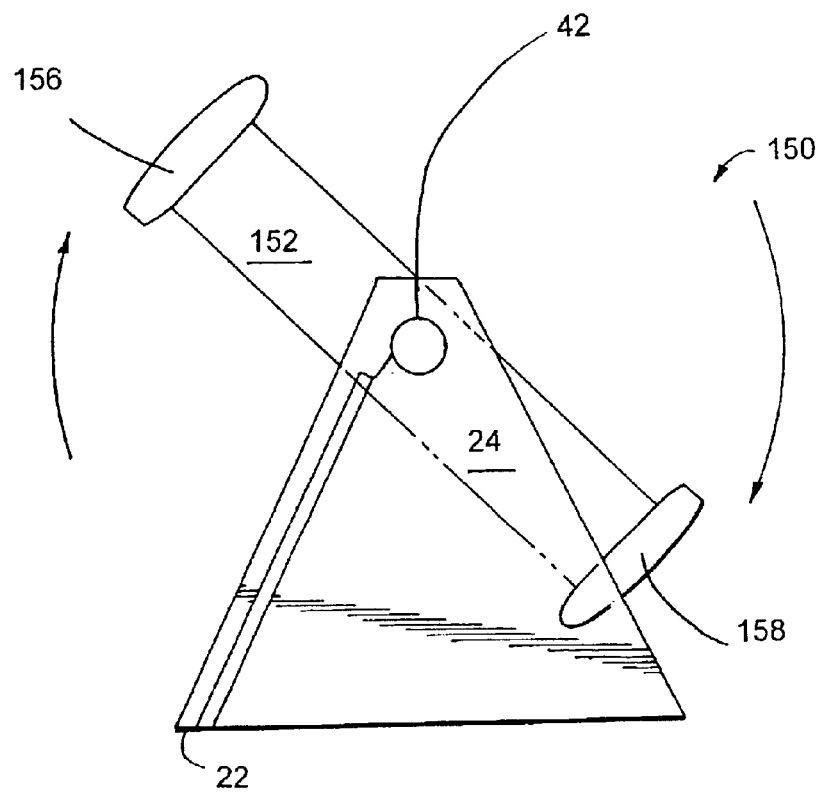
FIG. 13 is a side view of a second alternative embodiment of a vane, e.g. wing, turbine wheel in accordance with the present invention.

Referring now to FIG. 13, a side view of the first turbine wheel 152 of a second alternative embodiment for a vane, e.g., wing, design is generally indicated by numeral 150. The first turbine wheel 152 is rotatably connected to the shaft 22 that rotates within the first bushing 42 of the first support member 24. The first turbine wheel 152 includes a first turbine vane, e.g., wing, 156 and a second turbine vane, e.g., wing, 158.

Figure 14:
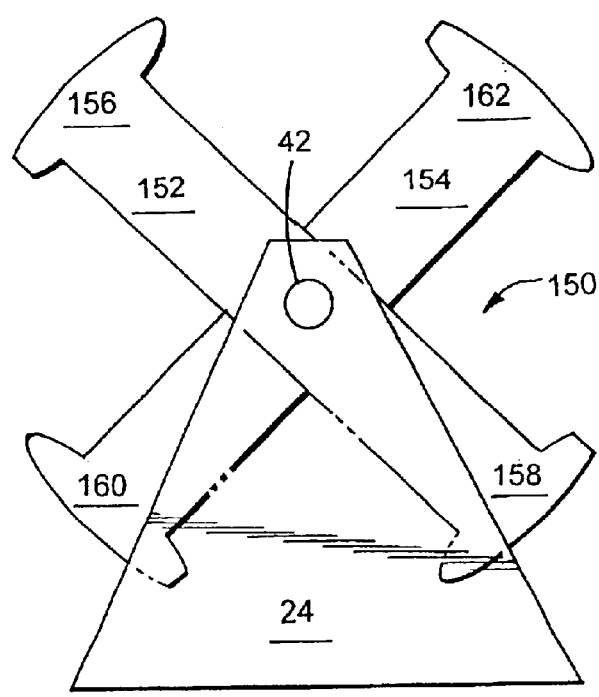
FIG. 14 is a side view of the second alternative embodiment, as shown in FIG. 13, of dual overlapping vane, e.g. wing, turbine wheels in accordance with the present invention.

Referring now to FIG. 14, a side view of the second alternative embodiment with dual vane, e.g., wing, design 150 including first and second turbine wheels 152 and 154 is shown. The first turbine wheel 152 is rotatably connected to the shaft 22 that rotates within the first bushing 42 of the first support member 24. The third turbine wing 160 and the fourth turbine wing 162 associated with the second turbine wheel 154 are also shown.

Figure 15:
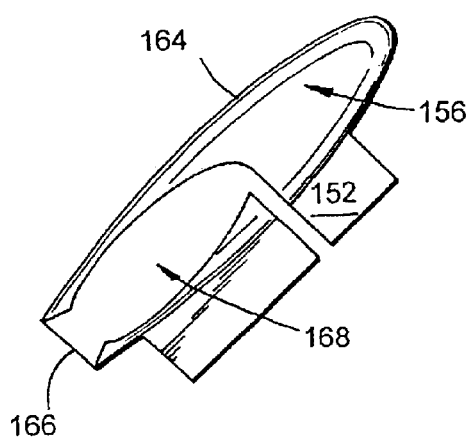
FIG. 15 is an isolated side view of a single fin for the vane, e.g. wing, turbine wheel of the second alternative embodiment, as shown in FIG. 13, in accordance with the present invention.

Referring now to FIG. 15, an isolated side view of the first turbine vane, e.g., wing, 156 is shown. This includes a housing 164, having an opening 166 in a chamber 168 that forms an air pocket in the first turbine vane, e.g., wing, 156. The preferred size of the chamber 168 is about four (4) cubic feet (0.1133 cubic meters). The preferred volume of the chamber 168 is about 4.5 gallons (17.034 liters). The preferred weight of the housing 164 is about fifty (50) pounds (22.68 kilograms).

Figure 16:
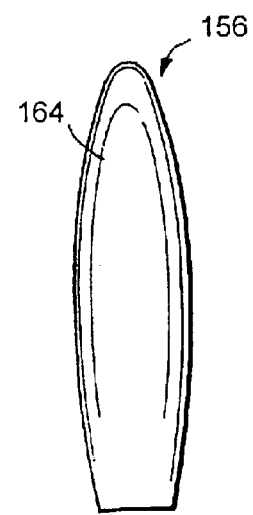
FIG. 16 is an isolated front view of a single vane, e.g. wing, for the vane, e.g. wing, turbine wheel of the second alternative embodiment, as shown in FIG. 13, in accordance with the present invention.

FIG. 16 is a front view of the second alternative embodiment with a first turbine vane, e.g., wing, 156 for the first turbine wheel 152. The first turbine vane, e.g., wing, 156 is again shown with the housing 164. Although the back of the housing 164 can be in a wide variety of geometric shapes, the preferred shape is a curved quarter of a circle in a form that is similar to a shark's fin that is sleek, smooth and can cut through the water smoothly. In other words, the housing 164 is quadrantal and elliptical. The preferred shape of a curved quarter circle reduces the drag on each vane, for example the first vane, e.g. wing 156.

Figure 17:
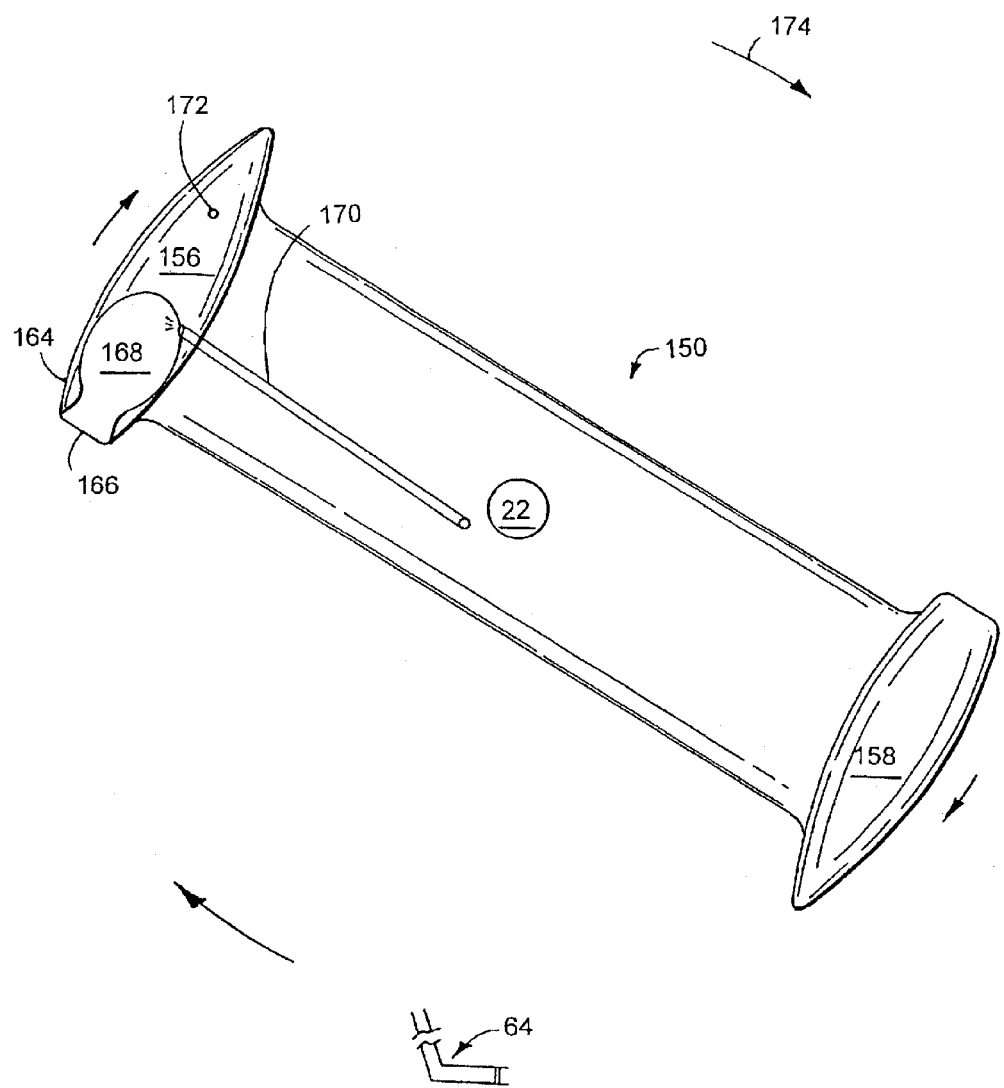
FIG. 17 is a side view of the second alternative embodiment of a vane, e.g. wing, turbine wheel, as shown in FIG. 13, with an illustrated air pocket and air jet nozzles, in accordance with the present invention.

Referring now to FIG. 17, there is shown a side view of the first turbine wheel 152 in the second alternative embodiment of a dual turbine vane, e.g., wing, 150. This includes the first turbine vane, e.g., wing, 156, an opening 166 in the chamber 168 that forms an air pocket within the housing 164. There is also a weighted area 172 in the housing 164 of the first turbine vane, e.g., wing, 156. This feature is replicated for the second turbine wing 158, respectively. This weighted area 172 pulls the first turbine wheel 152 into a downward cycle as indicated by numeral 174. There is a duct 170 that delivers the gas to the top of the chamber 168 and forces out the liquid, e.g., water. This duct 170 is able to get the gas, e.g., air, to the top of the chamber 168 so that no liquid, e.g., water, is trapped.

Figure 18:
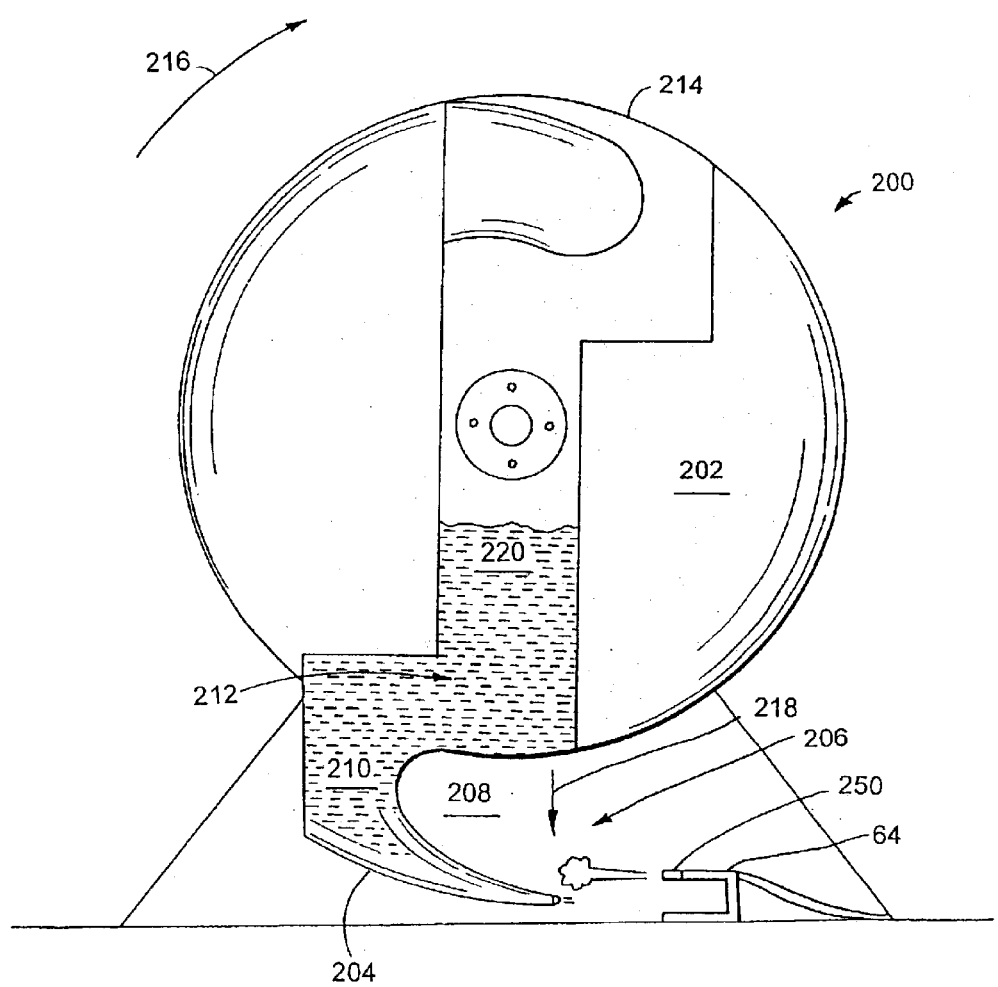
FIG. 18 is a side view of a third alternative embodiment of a vane with an illustrated air pocket and air jet nozzle.

FIG. 18 shows a side view of a third alternative embodiment of a dual vane, e.g., wing, generally indicated by numeral 200. The first turbine wheel is generally indicated by numeral 202. This dual vane, e.g., wing, embodiment 200 includes a wing 220 with a first vane, e.g., fin, 204, at one end and a second vane 214 at the other. The wing 220 is slideable relative to the first turbine wheel 202. Because the wing 220 is slideable, the shaft 22 does not extend through the first turbine wheel 202. The first vane 204 includes an opening 206 in a chamber 208 that forms an air pocket within a housing 210. There is also a weighted area 212 that is preferably located in a portion of the housing 210 adjacent the chamber 208. This feature is replicated for the second vane, e.g., fin, 214, respectively. This weighted area 212 pulls the first turbine wheel 202 into a downward cycle as indicated by numeral 216. The wing 220 is operatively connected via a rail (not shown) mounted on the turbine wheel 202. Bearing material may be placed between the vane 220 and the rail to reduce friction. The first turbine wheel 202 includes a cavity for each vane 204, 214 for the vane to move into as the wing 220 slides down.

The wing 220 starts off in a position with the first vane 204 proximate the gas nozzle 64. The gas nozzle 64 releases gas and is received by the chamber 208 of the first vane 204.

The wing 220 and the first turbine wheel 202 begin to rotate as shown by arrow 216. The gas is released as the first vane 204 reaches the top. When the first vane reaches the top, gravity acts upon the weighted area 212 and the wing slides toward the bottom in a direction shown by arrow 218. Sliding the wing 220 into a lower position reduces drag.

As seen in FIG. 18, the nozzle 64 may include a sensor 250, such as a photoelectric or magnetic sensor, for sensing when the vane is in position for receiving the burst of gas.

Figure 19:
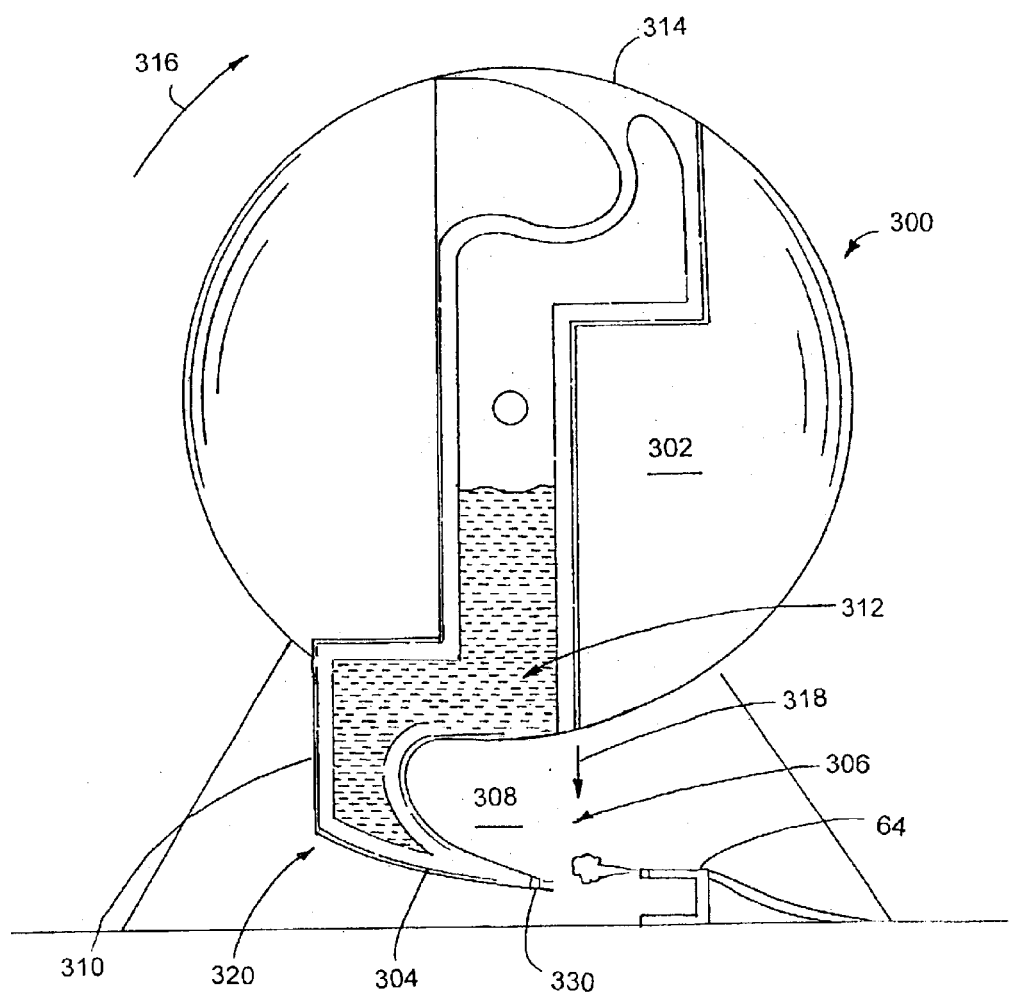
FIG. 19 is a side view of a fourth alternative embodiment of a vane with an illustrated air pocket and air jet nozzle.

Referring now to FIG. 19, a side view of a fourth alternative embodiment of a dual vane, e.g., wing, is shown and which is generally indicated by numeral 300. The first turbine wheel is generally indicated by numeral 302. This dual vane, e.g., wing, embodiment 300 includes a wing 320 with a first vane, e.g., fin, 304, at one end and a second vane 314 at the other. The wing 320 is slideable relative to the first turbine wheel 302. Because the wing 320 is slideable, the shaft 22 does not extend through the first turbine wheel 302. The wing has an open center 312 at least partially filled with a liquid. The liquid may be any number of liquids but is preferably water. The first vane 304 includes an opening 306 in a chamber 308 that forms an air pocket within a housing 310. The first vane 304 may further include an exhaust port 330 for filly releasing any remaining gas when in the up position. This feature is replicated for the second vane, e.g., fin, 314, respectively. This open center 312 pulls the first turbine wheel 302 into a downward cycle as indicated by numeral 316. The wing 320 is operatively connected via a rail (not shown) mounted on the turbine wheel 302. Bearing material may be placed between the vane 320 and the rail to reduce friction. The first turbine wheel 302 includes a cavity for each vane 304, 314, whereby the vane moves into the cavity as the wing 320 slides down. The wing 320 may be locked into place such that it does not slide when the liquid flows in the open center 312 and therefor the wing 320 only rotates in the direction shown by arrow 316.

The wing 320 starts off in a position with the first vane 304 proximate the gas nozzle 64. The gas nozzle 64 releases gas and is received by the chamber 308 of the first vane 304. The wing 320 and the first turbine wheel 302 begin to rotate in the direction shown by arrow 316. The gas is released as the first vane 304 reaches the top. While the first vane 304 moves towards the top, the liquid moves in the open center 312 towards the second vane 314. Gravity acts upon the liquid and the wing 320 slides down in the direction shown by arrow 318. Sliding the wing 320 into a lower position reduces drag.

The parameters used throughout this application vary tremendously, depending on the ratio found in Archimedes Principle, which recites that any object wholly or partially immersed in a fluid is buoyed up by a force equal to the weight of the fluid dispersed by the object.

INDUSTRIAL APPLICABILITY

The power plant system for generating electricity based on buoyant force 10 has zero emissions, is environmentally safe and is non-polluting. Moreover, the power plant system 10 can be built quickly compared to other types of electrical generating plants. This invention does not depend on fossil fuel, especially that provided by foreign countries. Furthermore, there is no environmental damage from drilling, mining or nuclear radiation and nuclear waste. In addition, the buoyant force power plant system 10 creates very little noise.

This present invention provides a desperately needed alternative energy source that is usable in any part of the world that can be manufactured in large numbers.

It will be readily apparent to one skilled in the art that there are a wide variety of turbine wheels, including multiple turbine wheels, e.g. more than two (2), and fin and/or wing vane designs that may utilized with this present invention. In addition, the size and depth of the chambers 92, 108, 168, 208, and 308 for the turbine wheels 12, 14, 102, 152, 154, 202 and 302 can vary tremendously as well as any of the other parameters associated with this invention.

Other aspects, objects and advantages of the present invention can be obtained from a study of the drawings, the disclosure and the appended claims.

What is claimed is:

1. A turbine power plant utilizing buoyant force, comprising:

a turbine wheel having a plurality of vanes, the turbine wheel being at least partially submerged in a liquid and further including a first side and a second side;

each vane having a chamber for receiving a gas to propel the turbine wheel;

means for reducing drag on each vane, wherein the means for reducing drag includes a slideable wing;

a nozzle for periodically supplying gas to the chamber;

a shaft operatively attached to the turbine wheel, the shaft rotatable attached to a first bushing and a second bushing, the first bushing located on a first support member that is located opposite the first side of the turbine wheel and the second bushing located on a second support member that is located opposite the second side of the turbine wheel, wherein the shaft is operatively attached to an electrical generator for producing electricity through rotation of the shaft; and means for supporting the shaft.

2. The turbine according to claim 1, wherein the slideable wing has an open center at least partially filled with a liquid.

3. The turbine according to claim 1, further comprising:

a weighted portion located proximate each chamber to provide a downward cycle of movement to the turbine wheel, facilitate rotation of the turbine wheel, and generally aid the sliding of the wing.

4. The turbine according to claim 1, further comprising:

a duct located within each chamber to direct the air to the top of the vane to maximize the application of the buoyant force to the turbine wheel.

5. The turbine according to claim 1, further comprising:

an exhaust port located on the vane for fully releasing the gas.

6. The turbine according to claim 1, further comprising:

a nozzle for periodically supplying gas to the chamber; and a sensor located on the nozzle for sensing when the chamber is in the lowest possible position.

7. A turbine power plant utilizing buoyant force, comprising:

a wing-shaped turbine wheel having a plurality of vanes, the turbine wheel being at least partially submerged in a liquid and further including a first side and a second side;

the turbine wheel having an open center at least partially filled with a liquid such that the liquid is acted upon by gravity and aids in the rotation of the turbine wheel;

each vane having a quadrantal housing having a generally elliptical hydrodynamic exterior surface, the housing including a chamber for receiving a gas to propel the turbine wheel;

a nozzle for periodically supplying gas to the chamber;

a shaft operatively attached to the turbine wheel, the shaft rotatably attached to a first bushing and a second bushing, the first bushing located on a first support member that is located opposite the first side of the turbine wheel and the second bushing located on a second support member that is located opposite the second side of the turbine wheel, wherein the shaft is operatively attached to an electrical generator for producing electricity through rotation of the shaft; and means for supporting the shaft.

8. The turbine power plant utilizing buoyant force according to claim 1, further comprising a slideable wing that aids in the rotation of the turbine wheel.

9. A turbine power utilizing buoyant force, comprising:

a turbine wheel having a slideable wing, the turbine wheel being at least partially submerged in a liquid and further including a first side and a second side;

the slideable wing having a plurality of vanes, each vane having a quadrantal housing having a generally elliptical hydrodynamic surface, the housing including a chamber for receiving a gas to propel the turbine wheel;

a nozzle for periodically supplying gas to the chamber;

a shaft operatively attached to the turbine wheel, the shaft rotatably attached to a first bushing and a second bushing, the first bushing located on a first support member that is located opposite the first side of the turbine wheel and the second bushing located on a second support member that is located opposite the second side of the turbine wheel, wherein the shaft is operatively attached to an electrical generator for producing electricity through rotation of the shaft; and means for supporting the shaft.

10. The turbine power utilizing buoyant force according to claim 9, in which the housing includes a weighted area such that the weighted area aids in the rotation of the turbine wheel and aids in the sliding of the wing.

11. The turbine power plant according to claim 9, wherein the slideable wing has an open center at least partially filled with a liquid such that the liquid is acted upon by gravity to aid in the rotation of the turbine wheel and aid in the sliding of the wing.

* * * * *

UNITED STATES PATENT AND TRADEMARK OFFICE
CERTIFICATE OF CORRECTION

PATENT NO. : 6,769,253 B1  
DATED : August 3, 2004  
INVENTOR(S) : Daniel S. Scharfenberg It is certified that error appears in the above-identified patent and that said Letters Patent is hereby corrected as shown below:

Column 4,  
Line 38, numerals "72 5" should read -- 72 --

Column 7,  
Line 24, the word "filly" should read -- fully --

Signed and Sealed this

Twenty-second Day of February, 2005

JON W. DUDAS  
*Director of the United States Patent and Trademark Office*